(12) United States Patent
Weissert et al.

(10) Patent No.: US 8,768,735 B2
(45) Date of Patent: Jul. 1, 2014

(54) AUTOMATED SERVICE FEES ASSESSMENT METHODS AND SYSTEM

(75) Inventors: François Weissert, Valbonne (FR); Arnaud De Chelle, Biot (FR); Eric Boudin, Roquefort les Pins (FR); Eric Lairy, Antibes (FR)

(73) Assignee: Amadeus S.A.S., Sophia Antipolis (FR)

( * ) Notice: Subject to any disclaimer, the term of this patent is extended or adjusted under 35 U.S.C. 154(b) by 1124 days.

(21) Appl. No.: 12/278,785

(22) PCT Filed: Jan. 31, 2007

(86) PCT No.: PCT/EP2007/050955
§ 371 (c)(1),
(2), (4) Date: Feb. 12, 2009

(87) PCT Pub. No.: WO2007/093502
PCT Pub. Date: Aug. 23, 2007

(65) Prior Publication Data
US 2009/0319305 A1    Dec. 24, 2009

Related U.S. Application Data

(60) Provisional application No. 60/780,305, filed on Mar. 9, 2006.

(30) Foreign Application Priority Data

Feb. 14, 2006    (EP) .................................... 06300130

(51) Int. Cl.
*G06Q 10/00*    (2012.01)
*G06Q 30/00*    (2012.01)

(52) U.S. Cl.
USPC ............................... 705/5; 705/1.1; 705/7.35

(58) Field of Classification Search
USPC ........................................................... 705/5
See application file for complete search history.

(56) References Cited

U.S. PATENT DOCUMENTS

| | | | |
|---|---|---|---|
| 5,987,429 A | 11/1999 | Maritzen et al. | |
| 6,295,521 B1 * | 9/2001 | DeMarcken et al. | 705/6 |

(Continued)

FOREIGN PATENT DOCUMENTS

| | | |
|---|---|---|
| WO | 0199022 A2 | 12/2001 |
| WO | 0207047 A1 | 1/2002 |
| WO | 0215101 A1 | 2/2002 |

OTHER PUBLICATIONS

Danish Search Report in Corresponding Singapore Application No. 200805641-8 dated Sep. 28, 2009.
Danish Written Report in Corresponding Singapore Application No. 200805641-8 received Sep. 8, 2009.

(Continued)

*Primary Examiner* — George Chen
(74) *Attorney, Agent, or Firm* — Wood, Herron & Evans LLP

(57) ABSTRACT

A computer travel system and methods for assessing travel service fees are described. System of the invention communicates, on one end, with a travel agent from a travel front office and, on the other end, with a system administrator who manages a price scheme database containing unitary fees and rules. Travel agent creates and modifies PNRs (passenger name records) from which service fees are assessed by a fee calculator. Fee calculator interfaces with the price scheme database to obtain unitary fees and rules to apply to get PNR service fees.

System administrator can modify unitary fees and rules and use a fee simulator over a travel business history of PNRs to estimate what would have been revenue with the modified unitary fees and rule.

System and methods of the invention enable an automatic assessment of travel service fees that can be recognized by the customer.

20 Claims, 5 Drawing Sheets

(56) References Cited

U.S. PATENT DOCUMENTS

| | | | |
|---|---|---|---|
| 6,584,419 B1* | 6/2003 | Alexander | 702/68 |
| 2002/0007327 A1* | 1/2002 | Steury et al. | 705/34 |
| 2003/0061145 A1 | 3/2003 | Norrid | |
| 2004/0210476 A1 | 10/2004 | Blair et al. | |

OTHER PUBLICATIONS

IP Australia, Examination Report 2 issued in Australian Patent application No. 2007214589 dated Jun. 26, 2012.

IP Australia, first Examination Report issued in Australian Patent application No. 2007214589 dated May 19, 2011.

* cited by examiner

```
ITIN_F = IF (ITIN="D") THEN 1 ELSE (IF (ITIN="I") THEN 2 ELSE 0)

VDCA_F = IF (VDCA="BA") THEN 2 ELSE (IF (VDCA="IB") THEN 1 ELSE 0)

BKCB_F = IF (BKCB="F") THEN 2 ELSE (IF (BKCB="C") THEN 1 ELSE
         (IF (BKCB="E") THEN 0.5 ELSE 0))

TKTP_F = IF (TKTP="P") THEN 3 ELSE (IF (TKTP="E") THEN 1 ELSE 0)

FRAM_F = IF (FRTP="N") THEN (IF NOT(FRAM<200) THEN (FRAM*5%)
         ELSE(IF (FRAM<100) THEN 10  ELSE (FRAM*4%)))
         ELSE (IF(FRTP="P") THEN (IF(FRAM<500) THEN (FRAM*6%)
         ELSE 80)   ELSE 100)

FLSS_F = FLSS*2

FLSX_F = FLSX*1

BKFE_T = FLSS_F+FLSX_F+CASS_F+CASX_F+HOSS_F+HOSX_F+RASS_F+RASX_F
         +INSS_F+INSX_F+CRSS_F+MCSS_F+MCSX_F+MHSS_F+MHSX_F+MTSS_F
         +MTSX_F+ATSS_F+ATSX_F+TOSS_F+TOSX_F+TKIS_F+TKVX_F+TKRF_F
         +TKRI_F+MOIS_F

SVF_T  = TKFE_T+BKFE_T+CTFE_T
```

Figure 6

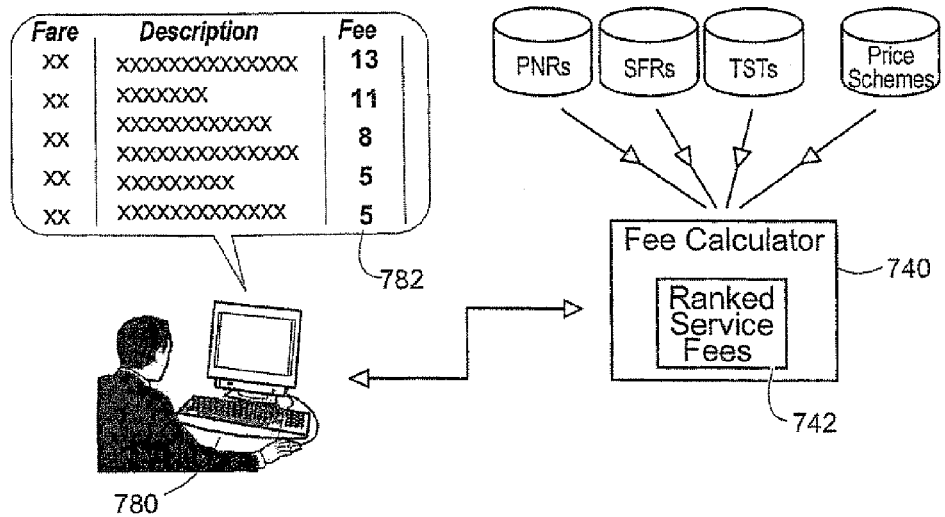

Figure 7

AUTOMATED SERVICE FEES ASSESSMENT METHODS AND SYSTEM

FIELD OF THE INVENTION

The present invention relates generally to transaction and service fees and, more particularly, to a method and system that enable the automated assessment of fees associated to the issuance of travel tickets by agents of travel agencies.

BACKGROUND OF THE INVENTION

Since ever, travel agencies that have a significant part of their business tied to the selling of air tickets (until recently, travel agencies used to sell approximately 70% of all airline tickets), needed only to rely on commissions paid by airlines to secure a significant part of their gross income. With this model in place, agencies could afford to not only deliver air tickets to their customers but they were also an invaluable, and unbiased, free source of information for travelers.

However, in recent years, triggered by a fierce competition between airlines that must reduce their operating costs to stay profitable, or just to survive, all major airlines have drastically reduced the commissions paid to travel agencies. In spite of the fact that these latter are still selling a good deal of their tickets, major airlines were forced to do so in an attempt to stay competitive especially, with the low-cost carriers issuing only dematerialized (electronic) tickets exclusively through their own selling channel i.e.; on-line, over the Internet, from their sites et servers. Indeed, all major airline carriers are now practicing a 'zero based travel agency commission' policy and this tends to spread to other travel service suppliers such as the large car rental companies.

The elimination of the commission traditionally paid to travel agents on the sale of airline tickets and other travel products has led travel businesses to seek new sources of revenues. Thus, most travel agencies have introduced service fees to replace or complement the traditional commissions. However, this introduction of service fees brings with it the specific challenge of how to efficiently process charges without impacting their business.

While some consumers are comfortable making arrangements directly with the airlines or through the Internet, many continue to rely on travel agents for unbiased information and expertise when planning trips. Indeed, the infrequent traveler may have difficulty with the complex shopping and buying process. Airline pricing is still very complex and somehow illogical with hundreds of fares, which may change on a daily basis, and with varying restrictions for each route. For those who traditionally rely on travel agents to help them with their travel plans, travel agencies must be prepared to disclose to them, in a clear and unambiguous manner, that any increase over the net price, or any fee for issuing a ticket, is not part of the ticket price to be paid to air carrier, but solely a reimbursement or fee for the services provided.

When major airlines drastically reduced commissions, before totally eliminating them, no mechanisms were however made available to travel agents to "build in" the service fees and demonstrate to their customers the value of the additional services rendered. Fee calculations were done manually, a repetitive, painful and time-consuming task implying high risks of mistakes due to the number of applied fees and the complexity of the rules to compute them which depends on the customer's importance and on the service requested. Also, service fees charged manually cannot be easily justified and communicated clearly to the end customer at any point in time Thus, there is a need for a system which solves the difficulties and complexities associated with the assessment of service fees and which may be recognized by the customer. Automated assessment of service fees at the point of sale i.e., in front office by the travel agent, must be possible to reduce the overall booking time and the risk of errors. The integration with mid and back office systems must be seamless to allow an efficient administration of the whole system, in spite of the multitude of service fees and complex transactions to manage. Also, it must be possible to track and update service fees and monitor transactions, from the back office, since they eventually determine the profit margins of the travel agencies.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The present invention discloses a computer travel system and methods for assessing travel service fees. System of the invention communicates, on one end, with a travel agent from a travel front office and, on the other end, with a system administrator who manages a price scheme database containing unitary fees and rules. Travel agent creates and modifies PNRs (passenger name records) from which service fees are assessed by a fee calculator. Fee calculator interfaces with the price scheme database to obtain unitary fees and rules to apply to get PNR service fees. System administrator can modify unitary fees and rules and use a fee simulator over a travel business history of PNRs to estimate what would have been revenue with the modified unitary fees and rule.

BRIEF DESCRIPTION OF THE DRAWINGS

FIG. 6 shows examples of rules.

FIG. 7 describes an option of the fee calculator that allows travel agents to maximize revenue of their travel business.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
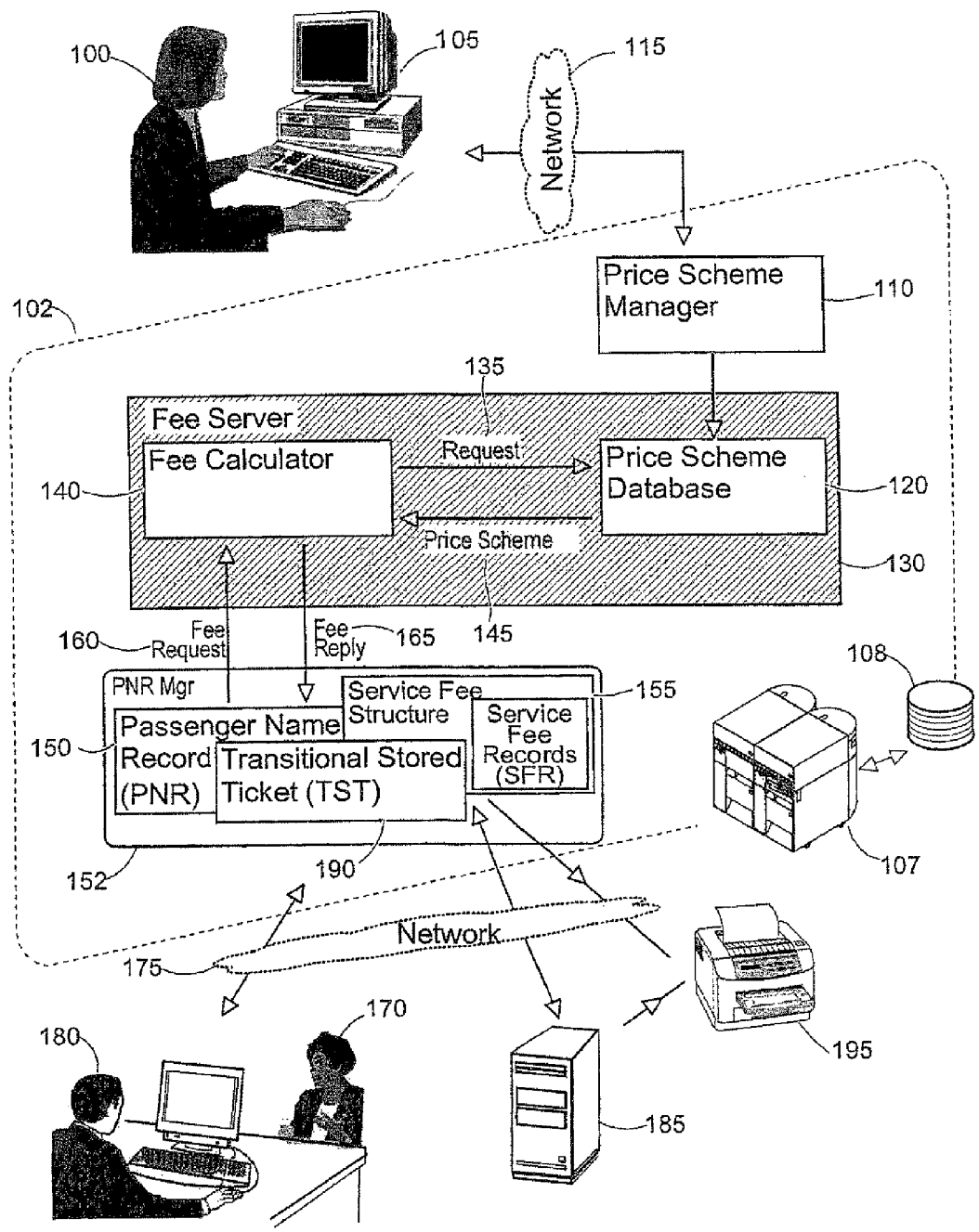
FIG. 1 describes the overall implementation and components of the invention.

FIG. 1 describes the overall implementation and components of the invention (102). All of the here after described components, necessary to carry out the invention, are normally implemented in computers (107) owned or operated on behalf of a computerized reservation system (CRS) a.k.a., global distribution system (GDS) i.e., any of several proprietary computer systems having access to large internal, local and remote storing means (108), allowing real-time access to airline fares, schedules, and seating availability and offering to travel agencies, from all over the world, the capability of booking reservations and generating tickets.

Loading and maintenance of service fees price models is performed by the administrator(s) of the system (100) through a price scheme manager application (110) which permits to control a price scheme database (120), part of the fee server (130), generally from a graphical user interface or GUI (105). The database is the repository of all price schemes and unitary fees used to compute the service fees for a particular travel organization and its affiliated travel agencies. Different travel organizations have obviously their own price scheme database managed by their respective administrators.

When normally in use from a front office, database is interrogated through requests (135) issued by a fee calculator (140) to which it returns the requested price schemes (145). Although this is not mandatory to carry out the invention, price scheme database (120) is preferably a relational database while requests and responses conform to the structured query language (SQL) generally used with this type of databases.

The fee calculator (140) applies all defined rules, as set by the administrators (100), on the price schemes and unitary fees fetched from database in order to obtain the service fees to apply to a particular customer (170). This is done from the passenger name record or PNR (150) as compiled by the travel agent (180) for its customer through a PNR manager application (152). PNR contains all of the passenger's information such as the details of its journey i.e.: departure and return flights, any connecting flights, special services required on board and also identification and personal data such as name, affiliation, phone numbers, address and so on. Associated to PNR, a transitional stored ticket or TST is also created (190). TST contains all is necessary to issue a ticket corresponding to PNR. Multiple TST's are allowed for a PNR while processing a customer request e.g., if a pricing is requested before the end of the transaction.

On the basis of PNR and TST a fee request can be issued (160) to which the fee calculator (140) will reply (165) so that fee amount can be displayed to the point of sale. The details of the service fees structure attached to the PNR are stored under the form of service fee records or SFR (155).

Components of the invention especially, the price scheme manager (110) used to manage the price scheme database (120) and the PNR manager (152) that handles PNR and associated components i.e., TST and SFR, are generally remotely accessed from, respectively, the administrators (100) and travel agents (180) generally through a variety of private and public communication networks (115, 175). This obviously includes the world network, the Internet, so that the interfacing with travel agents and administrators is most often achieved through graphic applications based on the Internet most spread application: the world-wide-web, or Web. Hence, browsers are used as clients of Web servers such as the fee server (130) of the invention. However, networks mentioned in FIG. 1 may be as well private networks generally operating under the TCP/IP (transport control protocol/internet protocol) suite of protocols and often referred to as intranet. Fee server according to the invention is not necessarily just a native Web server but may be as well a software application running on one or more mainframe computers, part of a large computing center run e.g., by one of the previously mentioned GDS. Typically, such computing centers are organized to offer a 24/7 type of service to thousands of customers thus, are made capable of handling the huge number of requests that may be issued simultaneously from the end-users (180, 100) of their system.

When transaction with customer (170) is over, invoice and ticket must be printed (195) in front office on the basis of the TST (190) and SFR (155) associated to the customer PNR (150). To this end, a computer in front office is generally made capable of communicating with the system of the invention (102) through the network (175). Alternatively, printer can be a network connected printer receiving directly its data from the system. Front office computer may also serve for accounting and to gather statistics so as office can be properly managed.

Figure 2:
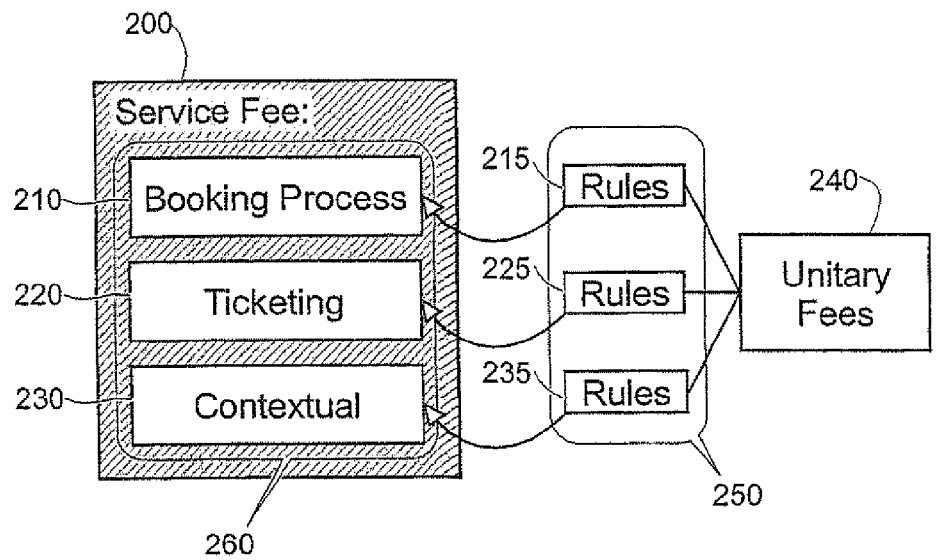
FIG. 2 shows how service fees are broken down in a plurality of service fee elements.

FIG. 2 shows how service fees (200) are broken down, in this example of carrying out the invention, into three elements to better assess its value to the customer.

First, service fees are made of a booking process fee (210) that reflects the complexity of creating a customer PNR. An important parameter is then the number of segments that have been created, modified or cancelled while building the PNR. As far as air travel is concerned a segment is the portion of a trip that starts with a take off and ends with a landing. However, many other parameters are considered and referred to as segments as well. A non limitative list include car, hotel, tour and railway segments and other services that have been included in the customer PNR to organize his trip. All segments thus eventually included in PNR and, possibly, all those that have been modified or cancelled have an associated unitary fee (240) in the price scheme database. Rules, further discussed in following figures, may apply (215) for the computation of the booking process fee. A rule in this case may simply consist in adding all unitary fees corresponding to the creation, modification or cancellation of PNR segments.

Then, service fees include a ticketing fee (220). This element of service fees considers things such as the total ticket price and the type of itinerary. Ticketing fee is e.g., different if Itinerary is only domestic or comprises one or more international destinations. Also the class of service is considered i.e., first, business or economy for an air flight and the type of issued ticket namely, paper or electronic. Calculation rules (225) are also associated with ticketing fees.

A contextual fee (230) is also assessed which takes into consideration fee parameters such as the time spent with the customer, the time of day, the type of delivery (mail, courier) and the booking channel through which sale has been carried out i.e.: in front office with a travel agent, over the phone or on-line through the Internet since large travel organizations and agencies now generally provide all these options for booking a trip to their customers. Like the above fee elements contextual fee uses rules too (235).

The total service fee may be any combination of the three service fee elements discussed above. This depends on how travel organizations want to charge service fees to their customers. A particular travel business may decide e.g., that service fees must be indeed the sum of booking process fee, ticketing fee and contextual fee while others will weigh differently the service fee elements or just ignore some of them.

Although the invention, as described here above, assumes that service fees are broken down into three fee elements (210, 220 and 230) it will be apparent to those skilled in the art that any type of partition could be envisaged as well to better fit a particular application of the invention or the specific service fees policy of a certain travel business.

As shown in FIG. 1 the method and system of the invention uses a price scheme database (120) which may contain a set of pricing scheme records per travel agency, or per travel organization, so that different travel businesses can use the invention with different rules and service fees. The set of rules (250) used to evaluate all the service fee elements (260) are further discussed in FIG. 6. Rules are based on a set of operators, including algebraic, logical and customizable ones in order to perform fee calculations from the price scheme database records and unitary fees managed by the administrators of the system.

Figure 3:
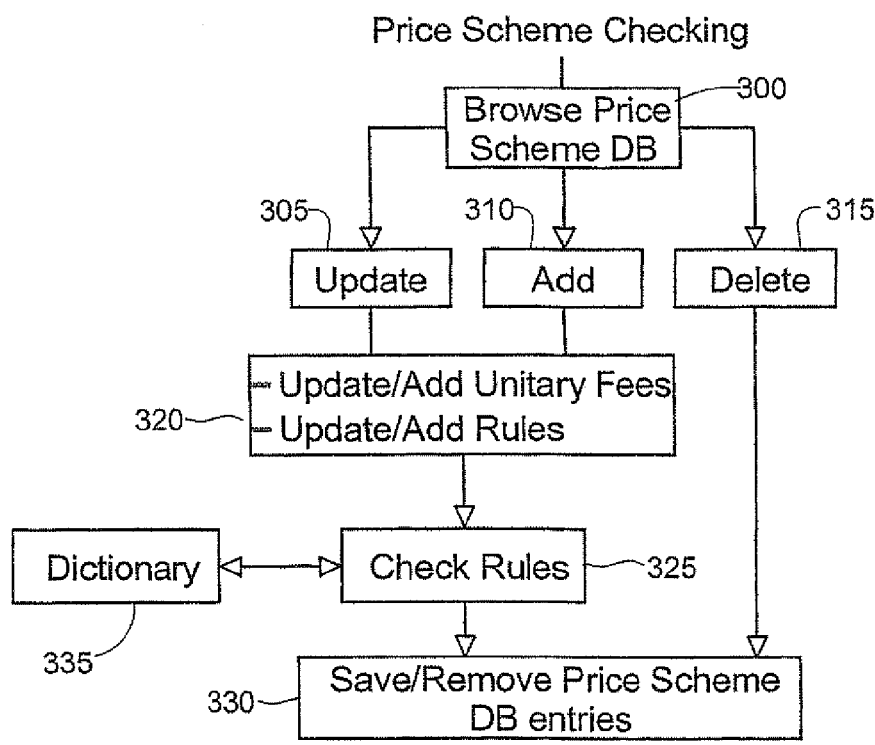
FIG. 3 discusses the management of the price scheme database records including the unitary fees and rules used to assess service fees.

FIG. 3 discusses the management of the price scheme database records including the unitary fees and rules.

A chief role of the administrators is to check the validity of the unitary fees and rules used to compute all PNR fees since this eventually determine the revenue of their travel business. Hence, price schemes must be gone through so that obsolete database entries can be updated (305) or just deleted (315) if they are no longer valid. This is typically the case for promotional travel offers which are removed after a certain date. New price schemes may have also to be created (310). When adding or updating price schemes the associated rules and unitary fees must be updated (320). New or updated rules must be carefully checked (325) prior to their actual use by travel agents and before they can be accessed on-line by a customer. Checking consist in parsing the rule into its components so as to verify that it conforms to the rule language syntax and can actually be used by the fee calculator shown in FIG. 1 to compute ticketing fees and contextual fees. Checking is performed in conjunction with a dictionary (335) of rule syntaxes. If errors are detected they can thus be corrected by the administrator attempting to add or update a price scheme. When done, price scheme is saved (330) in database or just removed from it if deleted.

Figure 4:
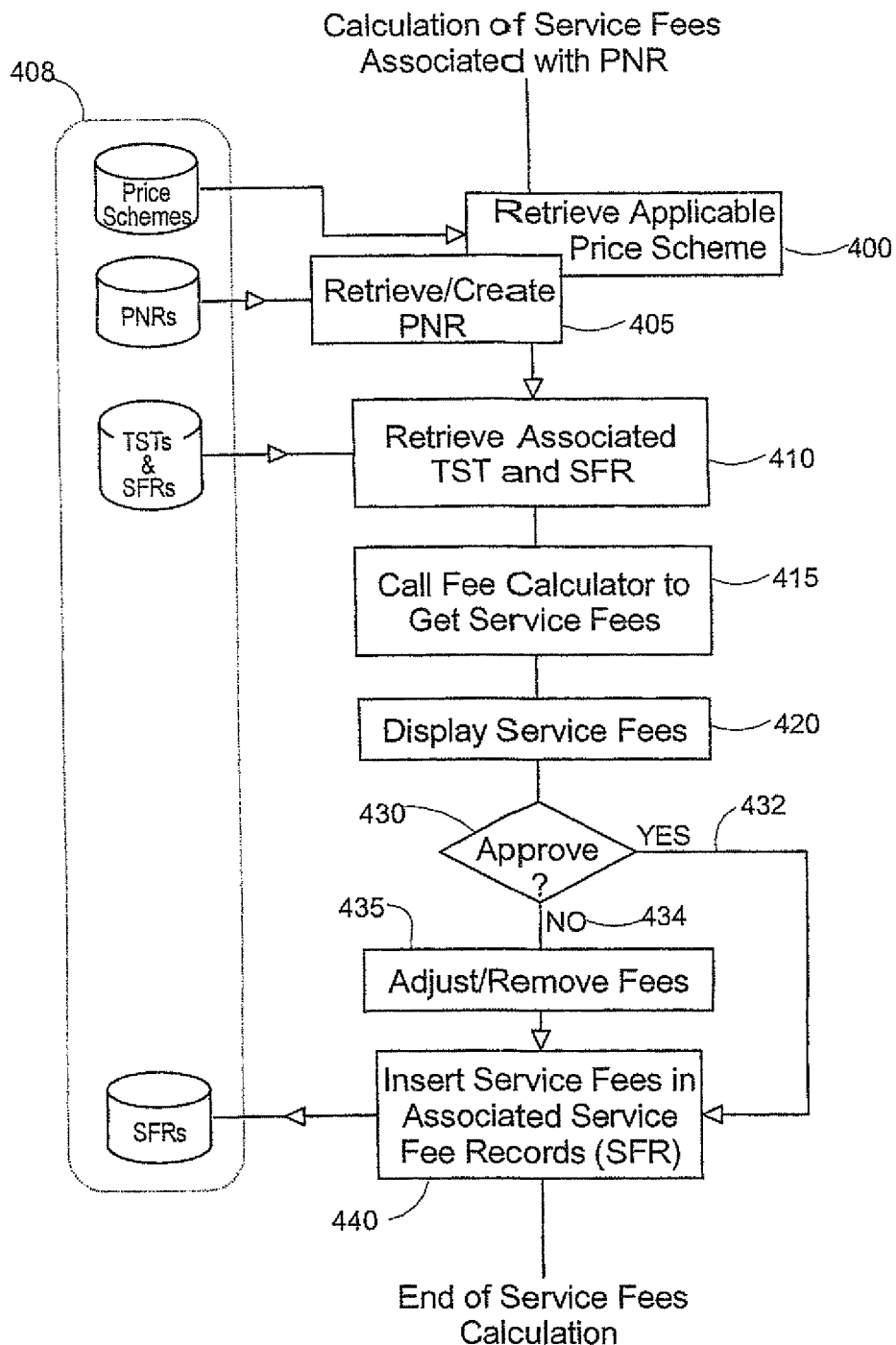
FIG. 4 depicts how service fees are assessed starting from customer PNR.

FIG. 4 depicts how PNR service fees are assessed for a transaction generally initiated by a front-end office travel agent (180) to meet a customer (170) request as shown in FIG. 1.

Process starts with the retrieval of an applicable price scheme (400) that corresponds to customer profile. A default price scheme for the travel agent, or the travel office, from where transaction is performed may have to be applied especially, if customer is not a corporate one i.e., is not affiliated to a company or a large organization that has negotiated fees. The channel through which the transaction is performed may have to be considered: in person in front office, over the phone or on-line etc. Also, customer PNR is retrieved or created (405). These two first steps need not to be executed in any mandatory order. Especially, if PNR is retrieved because it has already been created the applicable price scheme has generally already been determined.

The associated transitional stored ticket (TST) and service fee records (SFR) previously discussed, created with PNR, are retrieved too (410). PNR, TST and SFR are stored in computer memories of the travel agency service provider or GDS previously discussed. Storing is done under the form of flat files or databases (408) and made easily accessible by front-end travel agent from a remote location through network. When data is available, fee calculator (140) shown in FIG. 1 is called to compute service fees. This implies to parse the rules associated with the applicable price scheme so that fees comply with the rule instructions set by the administrators as discussed above.

Once calculated service fees can be immediately displayed (420) and communicated to the customer. When done through a travel agent this latter can still however approved or not (430) the calculated fee if it has indeed the right level of responsibility to do it. If approved (432) the fee is inserted as calculated in SFR (440) and stored back. If not (434), fees can still be manually adjusted or removed (435) before their insertion in SFR.

Figure 5:
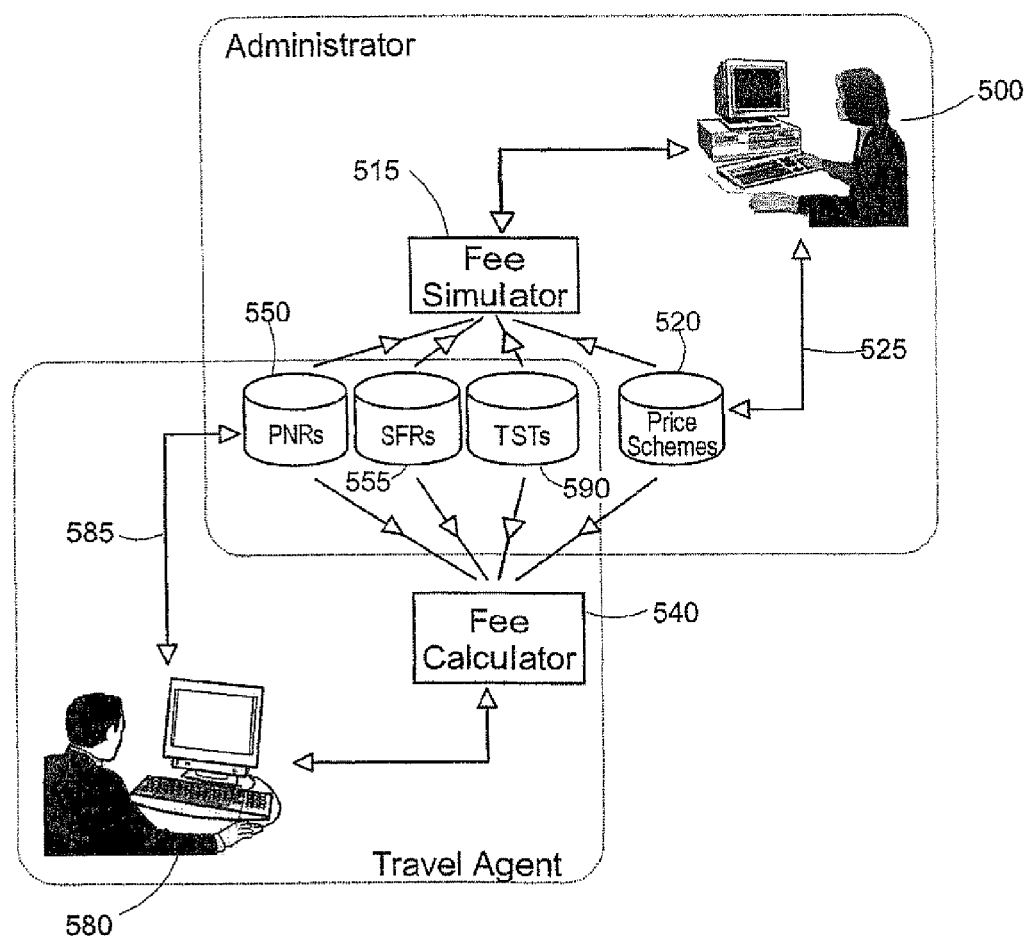
FIG. 5 discusses the respective roles of travel agent and administrator.

FIG. 5 discusses the respective roles of travel agents and administrators.

A travel agent (580), while creating or updating a PNR (550) and its associated TST (590) and SFR (555), is only authorized to invoke the fee calculator (540) to assess the service fees from the price schemes and unitary fees contained in database (520) so that service fees are eventually included in SFR (555). After some time of activity, a PNR history including service fees charged to customers, for a particular agency or travel business organization, thus becomes available.

The administrator of the system (500), who has the right of consulting and updating the unitary fees and rules contained in price scheme database (520), has also the possibility of accessing all created PNR's (550), TST's (590) and SFR's. Hence, a fee simulator (515), part of the price scheme manager previously discussed, enables administrator to assess what would have been the revenues if rules and unitary fees were set differently. The administrator which is generally a collaborator attached to a travel business has then the possibility of proposing a new fee service strategy to stay competitive with other travel businesses.

FIG. 6 describes, through some examples, the rules that are used to compute the ticketing and contextual elements of service fees.

The parsing of PNR and TST records is aimed at populating a set of variables and counters defined in data dictionary (335) already mentioned in FIG. 3 and used as rule inputs.

In this particular example of carrying out the invention, input variables and counters must not include underscored letters in their names. The data dictionary needs also to define fee variables. Names of these fee variables must then end with the two-character string '_F' (underscore, F) whereas names of total variables end with the two-character string '_T' (underscore, T). It should be obvious to the ones skilled in the art that other naming conventions could be adopted as well without departing from the spirit of the invention.

The rule engine of fee calculator uses a grammar with well-known operators like IF, THEN, ELSE, +, * . . . ) and a C-like syntax familiar to those skilled in the art of computer programming. A rule example is shown (600).

Hence, in this particular example, ITIN (610) is the itinerary type. It can be set to D (620) for a domestic flight and to I for an international flight. ITIN_F (630) is the itinerary fee which can take respectively a value of 1, 2 or 0. VDCA_F is the validated carrier (640). For this parameter air carrier can either be set to BA, which stands for British Airways or IB for Iberia. This fee value takes a value of 0 if none of them is selected.

The computation of FRAM_F (650) i.e., the fare amount fee is an example of a more complex rule. Fare type or FRTP (660) can take the value of N for negotiated fare. If the fare amount or FRAM (670) is more than 200 then the fee is worth 5% of FRAM, otherwise, if it less than 100, the fee takes a flat value of 10 otherwise, fee is 4% of FRAM, and so on.

Booking process fee or BKFE_T (680) is defined as the sum of various fees such as a fee for flight sell or FLSS_F, a fee for flight cancellation or FLSX_F, a fee for car sell or CASS_F, a fee for car cancellation or ASX_F and so on.

The service fee total amount i.e.: SVF_T (690) is for example, as already discussed with FIG. 2, the straight sum of the ticketing fee total amount or TKFE_T plus the booking process fee total amount or BKFE_T plus the contextual fee total amount or CTFE_T.

FIG. 7 describes an option of the fee calculator that allows travel agents to maximize the revenue of their travel business.

During the process of creating a PNR, numerous travel options are generally possible and discussed with customer which must operate a choice. Typically, this includes to choose between several air carriers or to select an itinerary when one or more stop-over are necessary to go from city A to city B. In the general case, not all possible options that match customer request generate the same amount of service fees for the travel agency since rules may have been set differently by the administrators as discussed in previous figure.

Hence, opportunities disclosed to customer are presented by fee calculator (740) so that travel agent (780) can pick first, among several options that all match customer request, the one which is the most interesting for the travel agency.

This is simply achieved by ranking fee calculator results so as to display them e.g., in decreasing values of service fees (782). Hence, fee calculator includes a device (742) to rank results.

Obviously, other types of ranking are possible so that generated service fees may not be the only criterion considered to display the travel options among them a choice must be operated.

What is claimed is:

1. A method of assessing travel service fees for a travel transaction, the method comprising:
   retrieving, by the computer, a previously stored passenger name record PNR or creating a passenger name record (PNR);
   retrieving, by the computer, a price scheme applicable to said PNR, wherein said price scheme is associated to a set of rules and to a set of unitary fees;
   creating, by the computer, at least one associated transitional stored ticket (TST);
   creating, by the computer, associated service fee records (SFR);
   retrieving, by the computer, the data of TST and SFR associated to the PNR;
   computing, by the computer, travel fares and a plurality of service fee elements with a fee calculator based on the set of rules and the set of unitary fees associated to the applicable price scheme, and on the data of the PNR and the data of the TST;
   determining, by the computer, travel fares and travel service fees of more than one travel option with the fee calculator comprising combining the plurality of service fee elements into said travel service fees;
   displaying said travel fares of the more than one travel option;
   displaying said travel service fees of the more than one travel option; and
   inserting, by the computer, said travel service fees into said SFR, thereby ending assessment of said travel service fees related to said PNR.

2. The method of claim 1, further comprising:
   storing said set of unitary fees in a price scheme database;
   storing said set of rules in the price scheme database; and
   establishing price scheme records associating said set of unitary fees and said set of rules.

3. The method of claim 2, wherein the plurality of service fee elements comprises at least one of:
   a booking process fee element;
   a ticketing fee element; and
   a contextual fee element.

4. The method of claim 2, further comprising:
   browsing entries of said price scheme database through a price scheme manager;
   updating obsolete price scheme database entries, by updating said set of unitary fees and updating said set of rules;
   checking said set of rules, by accessing a dictionary of rule syntaxes; and
   saving said price scheme database entries.

5. The method of claim 2, further comprising:
   browsing entries of said price scheme database through a price scheme manager;
   adding new price scheme database entries, by adding new set of unitary fees; and adding new set of rules;
   checking said new set of rules, by accessing a dictionary of rule syntaxes; and
   saving said price scheme database entries.

6. The method of claim 2, further comprising:
   browsing entries of said price scheme database through a price scheme manager; and
   deleting price scheme database entries.

7. The method of claim 1, wherein the displaying of said travel fares and said travel service fees includes ranking said more than one travel option on the basis of the amount of travel service fees, thereby enabling a choice according to a given travel office policy.

8. The method of claim 7, wherein said travel office policy comprises maximizing travel office revenue.

9. The method of claim 7, further comprising:
   creating new price scheme records associating a new set of unitary fees and a new set of rules, by:
   creating said new set of unitary fees and storing said new set unitary fees in a price scheme database; and
   creating said new set of rules and storing said new set rules in the price scheme database.

10. The method of claim 1, further comprising:
    after displaying said travel fares and said travel service fees, requesting approval of said travel service fees, and determining there is no approval to adjust said service fees.

11. A computer program product for assessing travel service fees, comprising a computer readable non-transitory medium bearing computer program code embodied therein for use with a computer, the computer program code, when executed on the computer causing the computer to execute:
    retrieving a previously stored passenger name record PNR or creating a passenger name record (PNR);
    retrieving a price scheme applicable to said PNR, wherein said price scheme is associated to a set of rules and to a set of unitary fees;
    creating at least one associated transitional stored ticket (TST);
    creating associated service fee records (SFR);
    retrieving the data of TST and SFR associated to the PNR;
    computing travel fares and a plurality of service fee elements with a fee calculator based on the set of rules and the set of unitary fees associated to the applicable price scheme, and on the data of the PNR and the data of the TST;
    determining travel fares and travel service fees of more than one travel option with the fee calculator comprising combining the plurality of service fee elements into said travel service fees;
    displaying said travel fares of the more than one travel option;
    displaying said travel service fees of the more than one travel option; and
    inserting said travel service fees into said SFR, thereby ending assessment of said travel service fees related to said PNR.

12. The computer program product of claim 11, wherein the displaying includes ranking said more than one travel option on the basis of the amount of travel service fees, thereby enabling a choice according to a given travel office policy.

13. The computer program product of claim 12, comprising further code causing the computer to execute:
   storing said set of unitary fees in a price scheme database;
   storing said set of rules in the price scheme database; and
   establishing price scheme records associating said set of unitary fees and said set of rules.

14. The computer program product of claim 13, wherein the plurality of service fee elements comprises at least one of:
   a booking process fee element;
   a ticketing fee element; and
   a contextual fee element.

15. The computer program product of claim 13, comprising further code causing the computer to execute:
   browsing entries of said price scheme database through a price scheme manager;
   updating obsolete price scheme database entries, by updating said set of unitary fees and
   updating said set of rules;
   checking said set of rules, by accessing a dictionary of rule syntaxes; and
   saving said price scheme database entries.

16. The computer program product of claim 13 comprising further code causing the computer to execute:
   browsing entries of said price scheme database through a price scheme manager;
   adding new price scheme database entries, by adding new set of unitary fees; and adding new set of rules;
   checking said new set of rules, by accessing a dictionary of rule syntaxes; and
   saving said price scheme database entries.

17. The computer program product of claim 13 comprising further code causing the computer to execute:
   browsing entries of said price scheme database through a price scheme manager; and
   deleting price scheme database entries.

18. The computer program product of claim 12, wherein said travel office policy comprises maximizing travel office revenue.

19. The computer program product of claim 12, comprising further code causing the computer to execute:
   requesting approval of said travel service fees, and
   determining these is no approval to adjust said travel service fees.

20. A computer travel system for assessing travel service fees, the computer travel system comprising:
   a first communication network connected to a travel front office device, said front office device further comprising a display;
   a second communication network connected to an administrator of said travel system;
   a passenger name record (PNR) manager module configured to create and modify passenger name records (PNRs) and associated transitional stored tickets (TSTs) and service fee records (SFRs);
   a storage device configured to store said PNRs with said associated TSTs and SFRs and a price scheme database containing sets of unitary fees and sets of rules;
   a price scheme manager configured to manage said price scheme database by accessing said PNRs, SFRs and TSTs through a fee simulator module; and
   a fee calculator module configured to apply said sets of rules and said sets of unitary fees obtained through said price scheme database to determine travel fares of more than one travel option for display on the display and to determine said travel service fees of the more than one travel option for display on the display.

\* \* \* \* \*

UNITED STATES PATENT AND TRADEMARK OFFICE
CERTIFICATE OF CORRECTION

| | |
|---|---|
| PATENT NO. | : 8,768,735 B2 |
| APPLICATION NO. | : 12/278785 |
| DATED | : July 1, 2014 |
| INVENTOR(S) | : Francois Weissert et al. |

Page 1 of 1

It is certified that error appears in the above-identified patent and that said Letters Patent is hereby corrected as shown below:

In the Specification:

At column 1, line number 30, change "et" to --and--

At column 4, line number 21, change "non limitative list include" to --nonlimitative list includes-- and at line number 62, change "uses" to --use-- and at line number 66, change "are" to --is--

At Column 5, line number 20, change "consist" to --consists of-- and at line number 60, change "approved" to --approve--

In the Claims:

At column 10, claim number 19, line number 7, change "these" to --there--

Signed and Sealed this
Ninth Day of September, 2014

Michelle K. Lee
*Deputy Director of the United States Patent and Trademark Office*